3,468,920
ADDITION PRODUCTS OF PHENOLS AND POLYMERIZED FATTY ACIDS
Victor Lewis Larimer, Bloomington, Minn., assignor to Archer-Daniels-Midland Company, Minneapolis, Minn., a corporation of Delaware
No Drawing. Filed Apr. 5, 1965, Ser. No. 445,741
Int. Cl. C08h 9/00; C07c 39/04
U.S. Cl. 260—407                                    5 Claims

ABSTRACT OF THE DISCLOSURE

Condensation products (e.g., phenol stearic acid) of phenolic compounds and unsaturated fatty acids or alcohols (including dimers and trimers thereof) are prepared by catalytically reacting these materials together in the presence of clay catalyst and a certain amount of water at superatmospheric pressure and elevated temperatures. The condensates, or alkylated phenolic compounds, are useful as anti-oxidants, corrosion inhibitors, anti-rust compounds, lubricating oil additives, polymer intermediates, emulsifiers, curing agents for epoxies, and surfactants.

---

The present invention relates to a process for alkylating phenolic compounds, especially with unsaturated fatty acids. In another aspect, the present invention relates to a process for alkylating phenol with oleic acid in the presence of significant amounts of free water.

Condensation of an aromatic compound with an unsaturated fatty acid occurs at a double bond of the unsaturated fatty acid and involves the addition of a hydrogen atom to one side of the unsaturated double bond and the addition of the aromatic residue to the other side of the unsaturated double bond. The resulting condensation product may be viewed as an aliphatic acid having an aromatic side chain.

The condensation product of an unsaturated fatty acid and a phenolic compound is an unusual product in that it and the initial reaction mixture contain both hydroxyl and carboxyl groups. The presence of these groups in the reacting ingredients poses a manufacturing problem in that the hydroxyl group of the phenolic compound tends to react with the carboxyl group of the unsaturated fatty acid to form a phenolic ester rather than the desired condensation product.

Barrett and Goebel, in U.S. Patent 3,074,983, have described a process for the manufacture of the condensation products described herein. They teach that a phenolic compound (e.g., phenol) can be reacted with an unsaturated fatty acid in the presence of a minor percentage of an acidic clay catalyst and in the further presence of 0.5 to 2.5 weight percent, preferably 1.0–2.0 weight percent, free water. They teach that, by using their reaction conditions, it is possible to reduce the formation of the undesired phenolic ester without significantly decreasing the yield of the desired condensation product. They further teach that the amount of water present is extremely important and that amounts outside the range of from 0.5 percent to 2.5 percent (based on the weight of the reactants, e.g., cresol and oleic acid) tend to interfere with the reaction and result in decreased yields, as well as other disadvantageous product characteristics.

Unfortunately, this critically limited water content precludes the use of certain commercially available forms of many phenolic compounds which contain, for example, as much as 15 or even 20 weight percent water. For example, commercial liquid phenol is ordinarily a mixture consisting essentially of about 88 weight percent phenol and about 12 weight percent water. Additionally, substantially anhydrous phenolic compounds of the type required in the process of Barrett and Goebel are often solids and would require the use of heated tanks and heated transfer lines. For example, anhydrous phenol, per se, is a solid and would require such heating.

It has now been discovered, and this discovery forms a basis for the present invention, that the desired condensation products can be made more economically and efficiently by using significantly greater amounts of free water in conjunction with super-atmospheric pressure (e.g., 300 p.s.i.g.) and elevated temperatures (e.g., 475° F.). When more free water is used, e.g., a total of 3.5 weight percent free water (based on the total system weight), and a mildly acidic, activated clay catalyst is used, common reactants can be used, yields of the desired condensation products can be increased, and product quality can be improved. One very important advantage is that commercial liquid phenol can be used, thus eliminating the need for heated tanks and transfer lines (necessary to handle solid phenol).

The inventive process described herein contemplates the reaction, in a reaction zone, of a phenolic compound with an unsaturated fatty acid in the presence of a catalytic amount of an activated clay catalyst and free water at an alkylation temperature of from 400°–650° F. More frequently, the temperature will be from 400°–550° F., preferably from 425°–525° F. Temperatures of from 450°–500° F. are especially preferred. The inventive process is conducted under elevated pressure to insure optimum yields and optimum product quality. Without elevated pressure, the free water in the system would be lost and it has been found that this is undesirable from the standpoint of yields and economics. Reaction pressures of up to 750 p.s.i.g. or higher can be employed, although it has been found preferable to employ reaction pressures of from 75–500 p.s.i.g. Pressures of from 150–400 p.s.i.g., and more frequently from 200–350 p.s.i.g., are especially preferred. The reaction mixture is allowed to react at an appropriate temperature and pressure for a time sufficient to form substantial amounts of the desired condensation product, e.g., 6½ hours. Reaction times will usually range from ½ to 20 hours, e.g., 4 to 12 hours.

While solvents can be used in certain instances, they are not ordinarily required by the processes described herein. Consequently, the use of solvents is not preferred, since slower reaction rates and purification problems accompany their use. However, it is recognized that inert solvents can be used to lower the viscosity and allow for easier handling and filtration.

Amounts of free water (i.e., water readily available as such and not present as water of hydration) of at least 2.75 weight percent, and preferably less than 7 weight percent, based on the combined weight of phenolic compound, unsaturated fatty acid, catalyst, and free water (hereinafter called total charge weight or system weight) will be used. More frequently, it will be desirable to operate with a total amount of free water of from 2.9 to 6.5 weight percent, e.g., 3.0 to 6.0 weight percent, calculated on the same basis. Optimum results are obtained when the total amount of free or available water in the system is from 3.2 to 4.0 weight percent, e.g., 3.4 to 3.8 weight percent. In calculating the total amount of water present, the amount of water present in the catalyst, fatty acid, and phenol should be considered.

The unsaturated fatty acids that are useful in practicing the present invention include the mono- and polyethylenically unsaturated fatty acids containing from 8–26 carbon atoms in their monomeric form, such as those monomeric fatty acids found in naturally occurring fats and oils. Especially preferred are the $C_{10}$–$C_{24}$ unsaturated fatty acids. While various substituted acids can be used, it is preferred that the acids contain only carbon and hydrogen in addition to the carboxy function. Dimer and trimer acids prepared from these unsaturated fatty acids can also be used, e.g., the dimer acid of oleic acid. Representative monomeric unsaturated fatty acids are oleic acid, linoleic acid, linolenic acid, palmitoleic acid, and erucic acid. Mixtures of unsaturated fatty acids can also be employed. Especially well suited for the practice of this invention are the monomeric unsaturated fatty acids (usually mixtures) obtained from soybean oil, linseed oil, tall oil, and the like. These mixtures can contain minor amounts of acetylenically unsaturated fatty acids and minor amounts of saturated fatty acids. Oleic acid, as well as mixtures of acids containing predominant amounts of oleic acid, are preferred. Interestingly enough, it has also been found that $C_8$–$C_{26}$, e.g., $C_{10}$–$C_{24}$, ethylenically unsaturated fatty alcohols, as well as the dimers and trimers thereof, can also be used in the present process.

The phenolic compounds that can be used in the present process include phenol, itself (which is the most preferred), as well as any of the various substituted phenols. Preferred substituents are alkyl and hydroxyl groups. The phenolic compounds must have an available hydrogen atom on at least one of the ring-carbon atoms, i.e., at least one of the benzenoid carbon atoms must be unsubstituted. Preferably, an available hydrogen atom will be ortho or para to the phenolic hydroxyl group. An especially preferred class of substituted phenols are those wherein the aromatic nucleus is substituted with one or more lower alkyl groups, usually containing from 1–8, e.g., 1–4, carbon atoms per alkyl group, and one or more hydroxyl groups. Another preferred class of phenolic compounds for use in practicing this invention is made up of the methyl substituted derivatives of phenol, e.g., cresol. Suitable phenolic compounds include phenol; 2,4 - dimethyl - 1,3 - dihydroxybenzene; p-cresol; pyrogallol; 2,6-ditertiary butyl phenol; resorcinol and the like. Mixtures of phenols can also be used.

The clay catalysts which can be uesd in practicing the present invention are the surface active clay minerals such as montmorillonite, hectorite, attapulgite and the like. The various montmorillonite-rich bentonites can also be used. Clay minerals of the montmorillonite type are preferred. Suitable activated clay catalysts are commercially available, e.g., the acid activated montmorillonite clays sold by the Filtrol Corporation. The amount of clay used will be a catalytic amount which may be as much as 20 percent or more, based on the combined weight of the two primary reactants (i.e., the combined weight of the phenol and the unsaturated fatty acid). Based on current practical considerations, it is convenient to operate with from 1 to 10 weight percent of clay catalyst, on the same basis.

In carrying out the present alkylation reaction, it has been found preferable to employ an excess of the phenolic compound to force the reaction to completion. By this it is meant that more than one mole of phenol (e.g., 1.25 moles of phenol) is used per mole of fatty acid (or fatty alcohol, as the case may be). Although it might be expected that one mole of phenol could be condensed with each mole of ethylenic unsaturation in a poly-unsaturated fatty acid, experience has shown that such is not the case. Where more than one mole of ethylenic unsaturation is present per mole of fatty acid (or alcohol), the resulting condensation product will only contain about one mole of phenol per mole of fatty acid, regardless of the amount of phenol used in excess of a mole ratio of phenol to fatty acid of 1:1. Preferably, this mole ratio will be at least 1.5:1, e.g., at least 2:1. After the reaction is complete, excess phenol can be removed by vacuum distillation, or other suitable techniques. The foregoing procedure is preferred rather than employing an excess of fatty acids since the temperature required to remove unreacted fatty acids by distillation are often so high as to cause product contamination and the like.

The present invention is further illustrated by the following specific examples which include a preferred embodiment. Unless otherwise indicated, all parts and percentages are by weight.

EXAMPLE 1

To illustrate the effect of free water content, a series of runs were made using a mole ratio of phenol, per se, to fatty acid of 2.5:1. The catalyst used was an acidic montmorillonite clay catalyst (Filtrol 78). The percent water used was based on the total system weight, (i.e., the combined weight of phenol, fatty acid, catalyst and water). The fatty acid used was a commercially available, narrow cut mixture of fatty acids, predominantly oleic acid. Each run was heated to 485° F. in a sealed reaction vessel under internally generated pressure for six hours. Then, the reaction mixture was cooled, filtered to remove the catalyst, and stripped of phenol and water under a 15 mm. Hg vacuum up to a pot temperature of 410° F. The residue was cooled, weighed and assayed for phenol stearic acid by infra-red analysis (IR) and gas-liquid chromotography (GLC). Also, the acid value (AV), hydroxyl value (OHV), and saponification value (SV) were determined. From this and allied data, ester content was calculated. These data are shown in Table I.

TABLE I.—EFFECT OF FREE WATER CONTENT

| Run: | Weight percent water | AV | SV | OHV | Percent ester | Percent conversion |
|---|---|---|---|---|---|---|
| 1 | 1.065 | 131.8 | 156 | 118 | 15.4 | 84.3 |
| 2 | 2.956 | 140.5 | 146 | 112 | 3.8 | 80 |
| 3 | 5.12 | 143 | 153 | 123 | 6.5 | 88 |
| 4 | 5.72 | 146.5 | 160.7 | 126 | 8.8 | 90 |
| 5 | 5.82 | 143.2 | 159.7 | 130.3 | 10.3 | 93.2 |
| 6 | 7.0 | 134 | 160.5 | 84 | 16.5 | 60 |

A plot of percent water versus percent conversion indicates that optimum conversion (and reaction rate) occurs at between 5.9 and 6.2 percent water in the reaction mixture. A plot of percent water versus percent ester indicates that side reactions are at a minimum between 2.9 and 4.5 percent water in the reaction mixture. These data (and other data) show that a superior quality product is obtained when about 3.4 to 3.8 percent water is present in the reaction mixture.

EXAMPLE 2

828 parts of commercial oleic acid (a mixture containing 90% unsaturated acid and 10% saturated fatty acid), 564 parts of phenol (mole ratio of phenol to fatty acid of about 2:1), 40 parts of a clay catalyst (Filtrol 78), and 50.8 parts of free water (3.43% of total reactant charge) were placed in a 316 stainless steel Parr reactor. The reactor was purged with nitrogen, sealed, and then heated to 460°–490° F. at 200–220 p.s.i.g. for seven hours with agitation. The reaction mixture was then cooled and distilled to remove excess phenol. The reaction product was analyzed as phenol stearic acid. Based on 90% unsaturated acid in the commercial fatty acid, 98% of the unsaturated fatty acid was converted to addition products. Of this amount, about 3% was ester (unwanted) and about 95% was phenol stearic acid (including about 2% phenol stearic anhydride).

EXAMPLE 3

700 parts of commercial oleic acid (90% ethylenically unsaturated acids), 649 parts of o-cresol, 42 parts of acidic clay catalyst (Filtrol 105), and 63.7 parts of free water (4.5 weight percent) were charged to a 316 stainless steel Parr reactor. The reactor was purged with nitrogen, sealed and then heated at 480°–490° F. at 300–340 p.s.i.g. for six hours with agitation. The reaction mixture was then cooled and filtered to remove the catalyst. Then, excess cresol was removed by vacuum distillation. Routine analyses were performed including the determination of acid value, saponification value, hydroxyl value, infra-red analysis, and gas-liquid chromotography. Conversion was determined by several alternate methods and was found to be about 93 weight percent based on the unsaturated acids present in the commercial oleic acid. The product was 9(10) cresol stearic acid (the aromatic residue can add to either side of the double bond). The ester produced was 5.8 percent.

EXAMPLE 4

497 parts of commercial oleic acid (90% unsaturated acids), 742 parts of 2,6-ditertiary butyl phenol, 43 parts of clay catalyst (Filtrol 78), and 50.42 parts of free water (3.8% based on the total reactant charge) were placed in a 316 stainless steel Parr reactor. The reactor was purged with nitrogen, sealed, and heated to 490°–500° F. at a pressure of 460–495 p.s.i.g. for six and one-half hours. The reaction mixture was then cooled, filtered to remove the catalyst, and the excess 2,6-ditertiary butyl phenol was removed by vacuum distillation. Approximately 65% of the unsaturated acids were alkylated during the six and one-half hour reaction cycle. The product 9(10) resorcinol alkylate of oleic acid.

EXAMPLE 5

276 parts of commercial oleic acid (90% unsaturated acids) 330 parts of resorcinol, 20 parts of activated montmorillonite clay catalyst (Filtrol 78), and 25 parts of free water (3.9% based on total reactant charge) were placed in a 316 stainless steel Parr reactor. The reactor was purged with nitrogen, sealed, and heated at 460°–500° F. under a pressure of 95–150 p.s.i.g. for nine hours with agitation. Product recovery was as described in Example 4. The product obtained was identified as the 9(10) resorcinol alkylate of oleic acid.

EXAMPLE 6

752 parts of oleyl alcohol (cis-9-octadecen-1-ol; 95% unsaturated alcohol), 528 parts of phenol, 45 parts of acidic montmorillonite clay catalyst (Filtrol 78), and 45 parts of free water (3.28% based on the total reactant charge) were placed in a 316 stainless steel Parr reactor. The reactor was purged with nitrogen, sealed, and heated to 460°–480° F. under a pressure of from 320–400 p.s.i.g. for seven hours. Product recovery was as described in Example 4. The reaction product was identified as a mixture of 9(10) phenol octadecanol-1 and 9(10) phenoxy ether of oleyl alcohol.

EXAMPLE 7

The procedure described in Example 2 was repeated using Filtrol 4 as the catalyst in the place of Filtrol 78. The reaction temperature was 470°–485° F. and the reaction pressure was about 215 p.s.i.g. After seven hours, the product was recovered in the manner described in Example 2. The product was analyzed as 9(10) phenol stearic acid. 3% of the desired product was the corresponding anhydride. 4.8% of the unwanted ester was formed.

EXAMPLE 8

425 parts of commercial ethylenically unsaturated dimer fatty acids (Empol 1014), 201 parts of commercial phenol (88% phenol and 12% water to give a water content of about 3.8 percent), and 24 parts of acidic montmorillonite clay catalyst (Filtrol 105) were placed in a 316 stainless steel Parr reactor. The reactor was purged with nitrogen, sealed, and heated to 435°–500° F. under a pressure of from 190–270 p.s.i.g. for six and one-half hours. The reaction mixture was then cooled, filtered to remove the catalyst, and stripped under vacuum (a vacuum of 29″ of mercury) to a temperature of 200° C. using a steam sparge. 87.5% of the dimer acids were converted into the monophenol substituted dimer acids. The reaction product contained no measurable amount of ester or anhydride.

From the foregoing examples and description, it will be realized that a process has been discovered for alkylating phenolic compounds with unsaturated fatty acids more economically and more efficiently than has heretofore been thought possible. By following the process as described herein, it is possible to utilize common, commercially available materials as reactants without the necessity for any pretreatment. The acid alkylated phenolic compounds produced according to the process of the present invention are known to be useful for a variety of industrial purposes, including use of antioxidants, corrosion inhibitors, anti-rusting compounds, lubricating oil additives, polymer intermediates, emulsifiers, and the like. The trimer and dimer acid alkylated phenolic compounds can also be used as curing agents for epoxidized compounds, e.g., the EPONS, and epoxidized fatty glycerides. The alcohol alkylated phenolic compounds are immediately suggested for use as resin intermediates, e.g., as by reaction with polycarboxylic acids and aldehydes. They are useful as antioxidants and as surfactants.

What is claimed is:

1. The addition product of a phenolic compound selected from the group consisting of phenol and phenol substituted by from one to two hydroxy groups, from one to two lower alkyl groups, or from one to two hydroxy groups and one to two lower alkyl groups and material selected from the group consisting of dimers and trimers of ethylenically unsaturated fatty acids having 8–26 carbon atoms per molecule, said addition product containing one mole of phenolic compound per mole of selected material.

2. The product of claim 1 wherein said phenolic compound is a lower-alkyl substituted phenol.

3. The product of claim 1 wherein said phenolic compound is phenol.

4. The product of claim 3 wherein said selected material is dimer acid.

5. The addition product of phenol and the dimer of oleic acid, said addition product containing one mole of phenol per mole of dimer acid.

References Cited

UNITED STATES PATENTS 2,246,762 6/1941 Schirn _____ 260—410.5
3,074,983 1/1963 Barrett et al. _____ 260—413

ALEX MAZEL, Primary Examiner

R. J. GALLAGHER, Assistant Examiner

U.S. Cl. X.R.

252—57, 351, 393, 404; 260—2, 47, 621

UNITED STATES PATENT OFFICE
CERTIFICATE OF CORRECTION

Patent No. 3,468,920  Dated September 23, 1969

Inventor(s) Victor Lewis Larimer

It is certified that error appears in the above-identified patent and that said Letters Patent are hereby corrected as shown below:

Column 1, lines 5 and 6, "Archer-Daniels-Midland Company, Minneapolis, Minn., a corporation of Delaware" should read: --Ashland Oil & Refining Company, Ashland, Ky., a corporation of Kentucky--

SIGNED AND SEALED

JUL 21 1970

(SEAL)
Attest:

Edward M. Fletcher, Jr.
Attesting Officer

WILLIAM E. SCHUYLER, JR.
Commissioner of Patents